Patented Mar. 13, 1928.

1,662,564

UNITED STATES PATENT OFFICE.

GEORGE F. COLBERT AND WILLIAM H. COLBERT, OF PITTSBURGH, PENNSYLVANIA.

METHOD OF MAKING MIRRORS.

No Drawing. Original application filed April 30, 1926, Serial No. 105,884, now Patent No. 1,603,936, granted October 19, 1926. Divided and this application filed July 30, 1926. Serial No. 126,086.

Our invention relates to mirrors, and has for its object the manufacture of a mirror that will not produce a glaring reflection when exposed to bright light, and which nevertheless possesses the property of more clearly reflecting objects than mirrors of the present type.

A further object is to produce a mirror surface which will absorb the incident light to such extent that the reflected images of brightly illuminated objects are more clearly defined than in the case of older type mirrors, with both natural and artificial light.

Another object of our invention is the economical manufacture of a non-glare mirror, which has greatly improved physical characteristics.

This application constitutes a division of our application, Serial No. 105,884, filed April 30, 1926, which has been issued as Patent No. 1,603,936 of Oct. 19th, 1926.

Non-glare mirrors of types heretofore commonly employed have been made either by using the front surface of a black or substantially opaque glass, or by using a clear glass that is darkened or obscured upon its rear surface. In such cases, both the opaque glass and the obscured rear face of the clear glass so absorbs light as to avoid glare, but a reflection is obtained only from the front polished surface of the mirror, and there is little depth or perspective to the images so produced. Consequently, when such a device is employed as a rear-view mirror on an automobile, for instance, the driver can not determine with any reasonable degree of certainty his approximate distance from a vehicle approaching from the rear. This is particularly true at night when the headlights of vehicles to the rear are reflected in the glass. One viewing reflections in a mirror of this character can not tell whether another vehicle or other object is ten yards or one hundred yards to the rear.

Another device that has been employed in order to provide a non-glaring reflection under certain conditions and a reflection that will be sufficiently clear under other conditions, is a structure comprising two mirrors—one of which is of colored or painted glass, for night driving, and the other of which is an ordinary silvered mirror, for daytime driving. These mirrors are adjustable, so that either one may be brought to the view of the driver, as desired. However, such an arrangement is merely a makeshift, because the shortcomings of colored or painted glass are still present when such glass is in use and the silvered mirror must be moved out of view or obscured when driving at night.

While our invention is particularly suitable for use in the production of rear view mirrors, it may be applied in other relations where a non-glaring reflection is desired.

Broadly stated, our invention comprises the application of a substantially opaque and partially absorbent reflecting coating to the rear surface of the mirror glass so that the images of all objects formed thereby will be clearly defined in proper proportion and perspective, while at the same time, glare is eliminated to such degree that the eyes of the observer are not strained or fatigued.

Some of the materials which we may employ in the manufacture of our improved absorbent-reflective coating are the salts of lead, or of a combination of metals such as silver, copper, nickel, cobalt, platinum, or of lead with any other suitable metal which will produce a dense, firm and strongly adherent film that can be deposited on the polished surface of a plate of glass or other suitable transparent substance in accordance with the process herein described.

In employing lead as a metallic base, a mixture for application to the rear surface of the mirror may be as follows:

*Solution No. 1.*

Lead acetate 1 oz. or 41.67 grammes, water 24 oz. or 1000.0 c. c.

*Solution No. 2.*

Sodium hydroxide or other alkali agent 2 oz. or 62.5 grammes, water 32 oz. or 1000.0 c. c.

*Solution No. 3.*

Thio urea 1 oz. or 20.83 grammes, water 48 oz. or 1000.0 c. c.

After preparation of the different solutions, the surface of the glass to be coated is washed and placed flatwise on a horizontal plate or table. The glass may either be at room temperature or be heated somewhat—to 95 degrees F., for example.

Solutions 1 and 3 are then mixed in the proportions of four parts of Solution No. 3 to one part of Solution No. 1. Thereafter Solution No. 2 is added to the mix, to the extent of one part of No. 2 solution and five parts of combined Solutions 1 and 3.

The completed mixture is immediately poured upon the glass, the chemical action between the various ingredients beginning as soon as the mixture is complete. The thin film of mixture, which is thus applied, immediately assumes substantially the temperature of the glass, and remains at such temperature during the period of precipitation, which begins promptly upon the application of the mixture to the glass. Within about ten or fifteen minutes, the lead, or other metal bases which may be used have been deposited upon the glass in the form of a dense, firm and strongly adherent film of substantially opaque metallic sulphide or sulphides. Thereupon the surplus of undeposited materials are removed and the precipitated matter permitted to dry, after which a coating of shellac or other similar lacquer and an opaque backing is applied. If lead is employed, as the metallic base, it is not necessary to apply a pigment, except as a protective coating, as is desirable in the case of some of the lighter colored metallic bases, such as silver and platinum.

The sulphur which is present in the thio urea combines with the lead acetate and forms a lead sulphide which adheres to the glass, and this sulphide constitutes the reflecting surface. The same is true if silver, copper, nickel, cobalt, platinum or the like is substituted for the lead acetate, but we have found the lead to be preferable.

Stated in percentages, the materials of the above-described solutions when combined would be approximately as follows, by weight:

| | Per cent. |
|---|---|
| Lead acetate | 0.67 |
| Sodium hydroxide | 1.01 |
| Thio urea | 1.35 |
| Water | 96.97 |

The percentages given may, of course, be varied somewhat. For example, we may provide a mixture containing:

| | Per cent. |
|---|---|
| Lead acetate | .1 to 2 |
| Sodium hydroxide | .1 to 3 |
| Thio urea | .2 to 5 |
| Water | 99.6 to 90 | but we find that while the percentage of thio urea may be varied widely, with satisfactory results, the best results are obtained by proportioning the lead acetate and sodium hydroxide to one another at the ratio of 67 to 101 parts, by weight, and using sufficient thio urea to change the lead contained in the lead acetate to lead sulphide, with water sufficient to serve as a carrying medium.

We have found that it is of substantial advantage to prepare the three separate solutions, and mix them together just before use, rather than to prepare only two solutions, one of which contains both the sodium hydroxide and the lead acetate, and the other of which contains the thio-urea. The advantage lies in the superior coating secured with the three solutions, as opposed to that secured by the two solutions, as above specified. When applied, using the three solutions as hereinbefore set forth, or when a solution containing both the thio-urea and acetate is mixed with a solution containing the hydrate and applied, films or coatings are produced which are uniform in thickness, of good color, and free from pin holes; while the two-solution process, using otherwise the same constituents and proportions, but having one of the solutions including both the acetate and the hydroxide, gives an inferior result, the coatings secured being less uniform in thickness, of a less desirable color, and having the pin hole defect to a marked degree. The successful practice of the process thus requires that the hydroxide should be added to the solution of thio-urea and lead acetate as the last step and immediately before the complete mixture is applied to the glass.

What we claim is:

1. The method of making a non-glaring mirror, which consists in preparing a mixture of solutions of a lead salt, sodium hydroxide, and thiourea, pouring such mixture immediately after its preparation upon the upper surface of a glass plate, while such plate is maintained with such upper surface in a horizontal position, and allowing the plate to stand until a dense opaque coating of lead sulphide is precipitated upon the plate.

2. The method of making a non-glaring mirror, which consists in preparing a mixture of solutions of a lead salt, sodium hydroxide, and thiourea, pouring such mixture immediately after its preparation upon the upper surface of a glass plate, while such plate is maintained with such upper surface in a horizontal position, and allowing the plate to stand until a dense opaque coating of lead sulphide is precipitated upon the plate, the temperature of the plate when the mixture is applied thereto not being substantially above 95 degrees F.

3. The method of making a non-glaring mirror, which consists in preparing a mixture of separately prepared solutions of a lead salt, sodium hydroxide, and thiourea, pouring such mixture immediately after its preparation upon the upper surface of a glass plate, while such plate is maintained with such upper surface in a horizontal position, and allowing the plate to stand until a dense opaque coating of lead sulphide is precipitated upon the plate.

4. The method of making a non-glaring mirror, which consists in preparing a mixture of solutions of lead acetate, sodium hydroxide and thiourea, pouring such mixture immediately after its preparation upon the upper surface of a glass plate, while such plate is maintained with such upper surface in a horizontal position, and allowing the plate to stand until a dense opaque coating of lead sulphide is precipitated upon the plate, the lead acetate and the sodium hydroxide being proportioned to one another in the ratio of approximately 67 to 101 parts by weight, and the amount of thiourea being sufficient to change the lead acetate to lead sulphide.

5. The method of making a non-glaring mirror, which consists in preparing a mixture of solutions of a lead salt, an alkali and thiourea, pouring such mixture upon the upper surface of a glass plate, while such plate is maintained with its upper surface in a horizontal position, and allowing the plate to stand until a dense opaque coating of lead sulphide is precipitated upon the plate, the alkali in solution being added to the solution containing the metallic salt and thiourea as the last step in preparing said mixture and immediately preceding the application of the mixture to the glass.

6. The method of making a non-glaring mirror, which consists in preparing a mixture of solutions of a metallic salt, an alkali, and thiourea, pouring such mixture immediately after its preparation upon the upper surface of a glass plate, while the plate is maintained with such upper surface in a horizontal position, and allowing the plate to stand until a dense opaque coating of metallic sulphide is precipitated upon the plate.

In testimony whereof we, the said GEORGE F. COLBERT and WILLIAM H. COLBERT, have hereunto set our hands.

GEORGE F. COLBERT.
WILLIAM H. COLBERT.